US007720847B2

(12) United States Patent
Driessen et al.

(10) Patent No.: US 7,720,847 B2
(45) Date of Patent: May 18, 2010

(54) APPARATUS AND COMPUTERISED METHOD FOR DETERMINING CONSTITUENT WORDS OF A COMPOUND WORD

(75) Inventors: Samuel J. Driessen, Nijmegen (NL); Pavel M. Iijin, Venlo (NL)

(73) Assignee: Oce-Technologies B.V., Venlo (NL)

( * ) Notice: Subject to any disclaimer, the term of this patent is extended or adjusted under 35 U.S.C. 154(b) by 617 days.

(21) Appl. No.: 11/092,653

(22) Filed: Mar. 30, 2005

(65) Prior Publication Data

US 2005/0222998 A1 Oct. 6, 2005

(30) Foreign Application Priority Data

Mar. 31, 2004 (EP) .................................. 04075975

(51) Int. Cl.
*G06F 7/00* (2006.01)
*G06F 17/30* (2006.01)
(52) U.S. Cl. ................... 707/736; 707/999.001; 707/999.002; 707/999.006; 704/1; 704/4; 704/10
(58) Field of Classification Search ........... 707/1, 707/3, 4, 6, 10, 100, 200; 704/1, 4, 10
See application file for complete search history.

(56) References Cited

U.S. PATENT DOCUMENTS

| | | | | |
|---|---|---|---|---|
| 5,778,361 | A * | 7/1998 | Nanjo et al. | 707/5 |
| 5,867,812 | A | 2/1999 | Sassano | |
| 6,396,699 | B1 * | 5/2002 | Caldwell et al. | 361/704 |
| 6,549,897 | B1 * | 4/2003 | Katariya et al. | 707/5 |
| 2003/0097252 | A1 | 5/2003 | Mackie | |
| 2004/0064447 | A1 * | 4/2004 | Simske et al. | 707/5 |
| 2004/0172378 | A1 * | 9/2004 | Shanahan et al. | 707/1 |
| 2005/0091031 | A1 * | 4/2005 | Powell et al. | 704/4 |

OTHER PUBLICATIONS

Berton et al., "Compound words in large-vocabulary German speech recognition systems", Spoken Language, 1996. ICSLP 96. Proceedings., Fourth International Conference, 1996, pp. 1165-1168. Download: http://ieeexplore.ieee.org/stamp/stamp.jsp?tp=&arnumber=607814&isnumber=13324.*
Soan et al., "Data-Driven Approach to Designing Compound Words for Continuous Speech Recognition", CiteSeerx, 1999. pp. 327-332. Download: http://citeseerx.ist.psu.edu/viewdoc/summary?doi=10.1.1.28.758.*
J. Kamps et al. "Language-dependent and Language-independent Approaches to Cross-Lingual Text Retrieval" 'Online! 2003, XP002292374.
Resnik, Philip, CMSC 838L Programming Assignment 2 Online! Sep. 26, 2001, XP002292375.
Aitao Chen, "Multilingual Information Retrieval Using English and Chinese Queries" CLEF 2001 Workshop, 'Online! Sep. 3, 2001, XP002292376.
R. Brand et al."Oce at CLEF 2003" 'Online! XP002292379.

* cited by examiner

*Primary Examiner*—John E Breene
*Assistant Examiner*—Hares Jami
(74) *Attorney, Agent, or Firm*—Birch, Stewart, Kolasch & Birch, LLP

(57) ABSTRACT

An apparatus, a computer program and a computerized method for determining constituent words of a compound word are provided. Constituent words constitute a compound word. When the constituent words comply to split decision criteria then the constituent words can be used in a separate form. The separate form of the constituent words is used in the search to retrieve the related documents from the document collection.

12 Claims, 7 Drawing Sheets

FIG. 5

Table 1:

| Flag status | \multicolumn{3}{c}{Decision criteria} | Decision result |
|---|---|---|---|---|
| | $w^L_{c(level)+1}$ is a word | $w^{c(level)+1}_{c(level)+1} = $ 's' | $w^L_{c(level)+2}$ is a word | Situation:= |
| False | yes | yes | yes | 1 |
| False | yes | yes | no | 2 |
| False | yes | no | yes | 3 |
| False | yes | no | no | 4 |
| False | no | yes | yes | 5 |
| False | no | yes | no | 6 |
| False | no | no | yes | 7 |
| False | no | no | no | 8 |
| True | any | any | any | - |

Table 2:

| Situation = | Flag = false | Flag = true |
|---|---|---|
| 1 | Flag := true;<br>CONSTITUENT( Word(level):= $w^L_{c(level)+1}$ );<br>CONSTITUENT( Word(level):= $w^L_{c(level)+2}$ );<br>sf:=c(level)+2; cf:=c(level)+3;<br>s:=c(level)+1; c(level):=c(level)+2; | Flag := false;<br>c(level) := cf;<br>s := sf |
| 2 | Flag := true;<br>CONSTITUENT( Word(level)= $w^L_{c(level)+1}$ );<br>sf:=c(level)+2;<br>s:=c(level)+1; c(level):=c(level)+2; | Flag := false;<br>c(level) := sf+1 |
| 3 | CONSTITUENT( Word(level):= $w^L_{c(level)+1}$ );<br>s:=c(level)+1; c(level):=c(level)+2; | |
| 4 | CONSTITUENT( Word(level):= $w^L_{c(level)+1}$ );<br>s:=c(level)+1; c(level):=c(level)+2; | |
| 5 | Flag := true;<br>CONSTITUENT( Word(level):= $w^L_{c(level)+2}$ );<br>s:=c(level)+2; c(level):=c(level)+3; | Flag := false;<br>c(level) := c(level) + 2 |
| 6 | Flag := true;<br>c(level) := c(level) + 2 | Flag := false;<br>c(level) := c(level) + 3 |
| 7 | c(level) := c(level) + 2 | |
| 8 | c(level) := c(level) + 2 | |

CONSTITUENT() results in: Add constituent words set $\{Word(h)^{h=level}_{h=1}\}$ to constituent words set list

FIG. 6

| Word (alphabetic order) | Document in which the word is found [document reference] | Number of documents referenced to |
|---|---|---|
| Basketbal | [1],[2],[3],[4],[5],[6],[7],[8] | 8 |
| Kam | [10] | 1 |
| Kampioen | [11] | 1 |
| Kampioenschap | [12],[13] | 2 |
| Kampioenschappen | [1],[2],[3],[4],[5],[6],[9] | 7 |
| Oen | [14] | 1 |
| Pen | [15] | 1 |
| Pi | [16], [17] | 2 |
| Pioen | [18] | 1 |
| Schap | [19] | 1 |
| Schappen | [20] | 1 |

FIG. 7

| constituent words set j | Constituent words constituting the compound word "Basketballkampioenschappen" | DT(i) | DP(i,j) | DT(i)<3*DP(i,j) | Separate words |
|---|---|---|---|---|---|
| 1 | basketbal + kampioenschappen | 0 | 6 | Yes | basketbal, kampioenschappen |
| 2 | basketbal + kam + pi + oen + schappen | 0 | 0 | No | |
| 3 | basketbal + kam + pi + oen + schap + pen | 0 | 0 | No | |
| 4 | basketbal + kam + pioen + schappen | 0 | 0 | No | |
| 5 | basketbal + kam + pioen + schap + pen | 0 | 0 | No | |
| 6 | basketbal + kampioen + schappen | 0 | 0 | No | |
| 7 | basketbal + kampioen + schap + pen | 0 | 0 | No | |
| 8 | basketbal + kampioenschap + pen | 0 | 0 | No | |

APPARATUS AND COMPUTERISED METHOD FOR DETERMINING CONSTITUENT WORDS OF A COMPOUND WORD

This application claims the priority benefit of European Patent Application No. 04075975.5 filed on Mar. 31, 2004, which is hereby incorporated by reference.

BACKGROUND OF THE INVENTION

1. Field of the Invention

The present invention relates to an apparatus for determining constituent words of a compound word. The invention also relates to an information retrieval system incorporating such an apparatus and a computerized method for determining constituent words of a compound word.

2. Discussion of the Background Art

A compound of words is common in a number of languages such as German, Dutch, Danish, Greek, Norwegian, Swedish, Icelandic and Finnish. Since compound words may be joined freely, this vastly increases the vocabulary size. These languages are likely to include very long words that are not found in any dictionary of the language. A typical example of such a word is the German compound word "Abschreibungsmöglichkeiten". This compound word is constructed by concatenating the two words "Abschreibung" and "möglichkeiten" by means of the linking morpheme "s".

In the description of the present invention that follows, the decomposition of a compound word into its constituent words and linking morphemes, if any, is referred to as a segmentation of the compound, or splitting the constituent words of a compound word into the words in a separated form, and is represented by character strings separated by the symbol "+". For example, the segmentation of the compound word "Abschreibungsmöglichkeiten" is represented as "Abschreibung+s+möglichkeiten". Other linking morphemes such as "-" or "es" could be used.

Word compounding is an active way of creating new words in these languages. This gives challenges for a number of applications such as machine translation, speech recognition, text classification, information extraction, and information retrieval. Finding constituent words constituting a compound word showed to be a challenge. There are basically three solutions known in the art.

The first solution is to keep a list of 'all' the compound words that exist in a language and the way the compound word should be split. A drawback, however, is that it is impossible to keep a list of all the compound words in a language, for there are literally an endless number of compound words in the compound word languages. For this reason the precision of this solution is low and this method is tedious. The approach applies for one language.

The second solution is simple: finding constituent words constituting the compound words based on rules, sometimes combined with statistics that state when to split. The problem here, however, is that this method often splits the compound word in words that do not exist or in word combinations that do not relate to the meaning of the compound word. Further, it works for the general cases of compound words, but is not robust. The approach applies for one language.

The third and last solution uses a digital dictionary. Based on the dictionary and some rules, the finding of constituent words constituting the compound word takes place. An example of this last solution is disclosed by U.S. Patent Application Publication No. U.S. 2003/0097252A1. According to that disclosure, finding the constituent words is based upon a set of compound word probabilistic breakpoints. Breakpoint weights are assigned to the breakpoints in the compound word based on an analysis of n-graphs drawn from an appropriate lexicon. This method may find words within a compound word, but the main drawback is that wrong word splitting can occur.

SUMMARY OF THE INVENTION

To overcome drawbacks of the background art, it is an object of the present invention to determine constituent words of a compound word. This is achieved by a method including determining a ratio between the number of documents containing the compound word and the number of documents containing the constituent words constituting the compound word, and splitting the compound word in the constituent words when the ratio is smaller than a threshold value.

This method according to an embodiment of the invention is based upon the observation that when the ratio between the number of documents containing a compound word and the number of documents containing the constituent words constituting the compound word is smaller than a threshold value, then the compound word is correctly split into the fond constituent words.

In a further embodiment, the method according to the invention comprises detecting a linking morpheme in the compound word. The detection of a linking morpheme in the compound word is essential for finding the constituent words.

In a further embodiment, the method according to the invention comprises a word list derived from the document collection and means for finding the constituent words constituting the compound word by using the word list. The detection of constituent words constituting the compound word is more efficient when a priori a word list is prepared containing all words of the document collection.

In a next embodiment, the method according to the invention comprises a word list derived from the document collection and means for determining from the word list the number of documents containing the compound word. It is efficient to have a word list from which the number of documents containing the compound word can be derived.

In a next embodiment, the method according to the invention comprises a word list derived from the document collection and means for determining from the word list the number of documents containing the constituent words constituting the compound word. It is efficient to have a word list from which the number of documents containing the constituent words constituting the compound word can be derived.

The invention also provides an apparatus/system and computer software for implementing the methods of the present invention.

In a next embodiment, the apparatus/system according to the invention is incorporated in an information retrieval system. A user enters a search term and, if this term is a compound word, it is split in its constituent words and a search is carried out for the constituent words. This way the operator can create a search on which all documents are found that contain the constituent words complying the split decision criteria constituting the compound word.

In a next embodiment according to the invention, the threshold value is selected depending on the document collection. This makes it possible to select the threshold value depending on the used document collection. This to optimize the splitting of the compound word.

In a further embodiment according to the invention, the threshold value is 3. This shows to be the optimal threshold value for a Dutch document collection.

In a further embodiment according to the invention, the compound word and constituent words belong to the grammatical category of nouns.

In a further embodiment, the apparatus and method according to the invention comprise the word list includes the single and plural form of each noun. This results in that all constituent words constituting the compound word are found.

The invention will now be explained with reference to the following exemplified embodiments of the present invention, and illustrated by reference to the drawings. These embodiments serve to illustrate the invention and should not be regarded as a limitation thereof.

BRIEF DESCRIPTION OF THE DRAWINGS

The invention will be explained in detail with reference to the accompanying drawings wherein:

FIG. 5 is an embodiment of Tables 1 and 2 according to the present invention;

FIG. 6 is an embodiment of an example of a word list according to the present invention; and FIG. 7 shows an example of the intermediate results of the method for the compound word "basketbalkampioenschappen" according to the present invention.

DETAILED DESCRIPTION OF THE PREFERRED EMBODIMENTS

Figure 1:
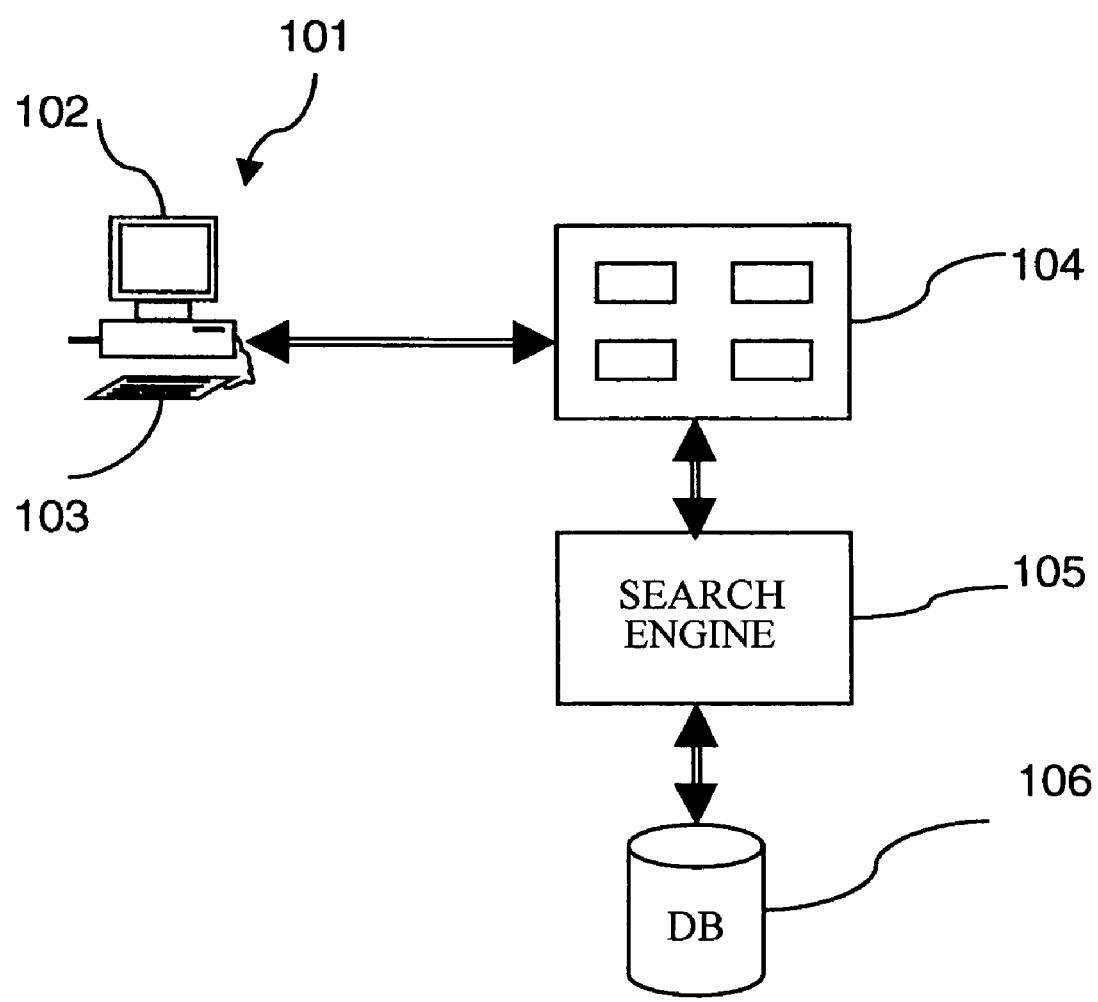
FIG. 1 is a block diagram of an embodiment of a document management system according to the present invention.

FIG. 1 illustrates an embodiment of an information retrieval system such as a document management system or web search system according to the present invention.

Referring to FIG. 1, the document management system comprises an operator console (101), a search engine front-end (104), a search engine (105), and a document database (106), all operatively coupled. The operator console provides a user interface to the system according to the invention, and is provided with a display (102) and data entry means, e.g. a keyboard (103). The search engine front-end (104) converts all data that is received from the operator console (101) into a search to be carried out by the search engine (105). The search engine (105) carries out the search on the database (106) and takes care that search results are returned to the submitter. The database (106) contains the documents to search for.

Many variations of the document management system are possible. For instance, in a first variant all components of FIG. 1 may be incorporated into one personal computer. In another variant, the search engine (105), search engine front end (104) and document database (106) are embodied in a server, and numerous operator consoles (101), embodied as workstations, may access as client the server and use a web browser as access means to the server.

Figure 2:
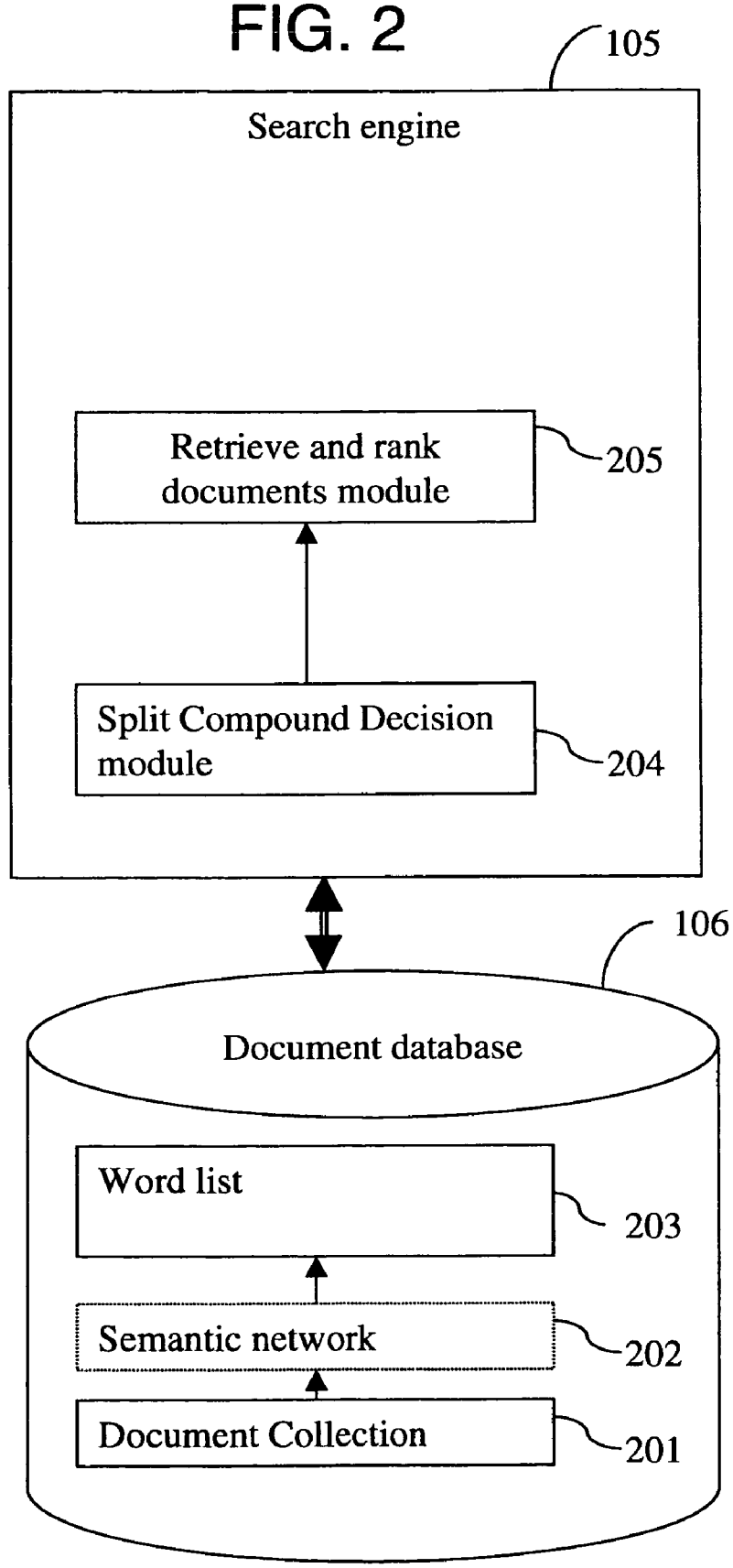
FIG. 2 is a block diagram of an embodiment of the search engine and document database of FIG. 1 according to the present invention.

FIG. 2 presents an embodiment of the search engine (105) and document database (106) according to the invention. The document collection (201) may contain any form of written information such as reports, newspaper articles, and webpages. Before the actual search process starts, all words of the document collection (201) are collected by means of for example a semantic network (202) and are put in order in a word list (203) in the database (106). For automatic translation or information retrieval, best results are obtained by considering only the words that exist in the document collection. Collecting all words from the document collection and putting these words in an ordered form in a word list does this.

The search process starts when the search engine (105) receives a search from the search engine front-end (104). An example of a search containing T terms is $t_1$ AND $t_2$ AND ... AND $t_T$ where a term $t_i$ is a term from the group of used terms; $t_i \epsilon (t_1, \ldots, t_T)$. A term can be any word. Between terms any logical operator can be used such as AND, OR, and NOT. The person skilled in the art will understand that the search has T terms, where T is at least one. The person skilled in the art will also understand that the invention is fully capable of handling one or more terms within the search.

The split compound decision module (204) of the search engine (105) decides for every term within a search whether the term contains constituent words that should be applied in a separate form in the search. The result of the split compound decision module (204) is a modified search that contains the constituent words of the compound words in a separated form.

The retrieve and rank documents module (205) of the search engine (105) uses this modified search and the word list to get document references to calculate the relevance score per document reference, to rank the found document references and to communicate the ranked document references with their relevance scores to the search engine front-end (104).

Figure 3:
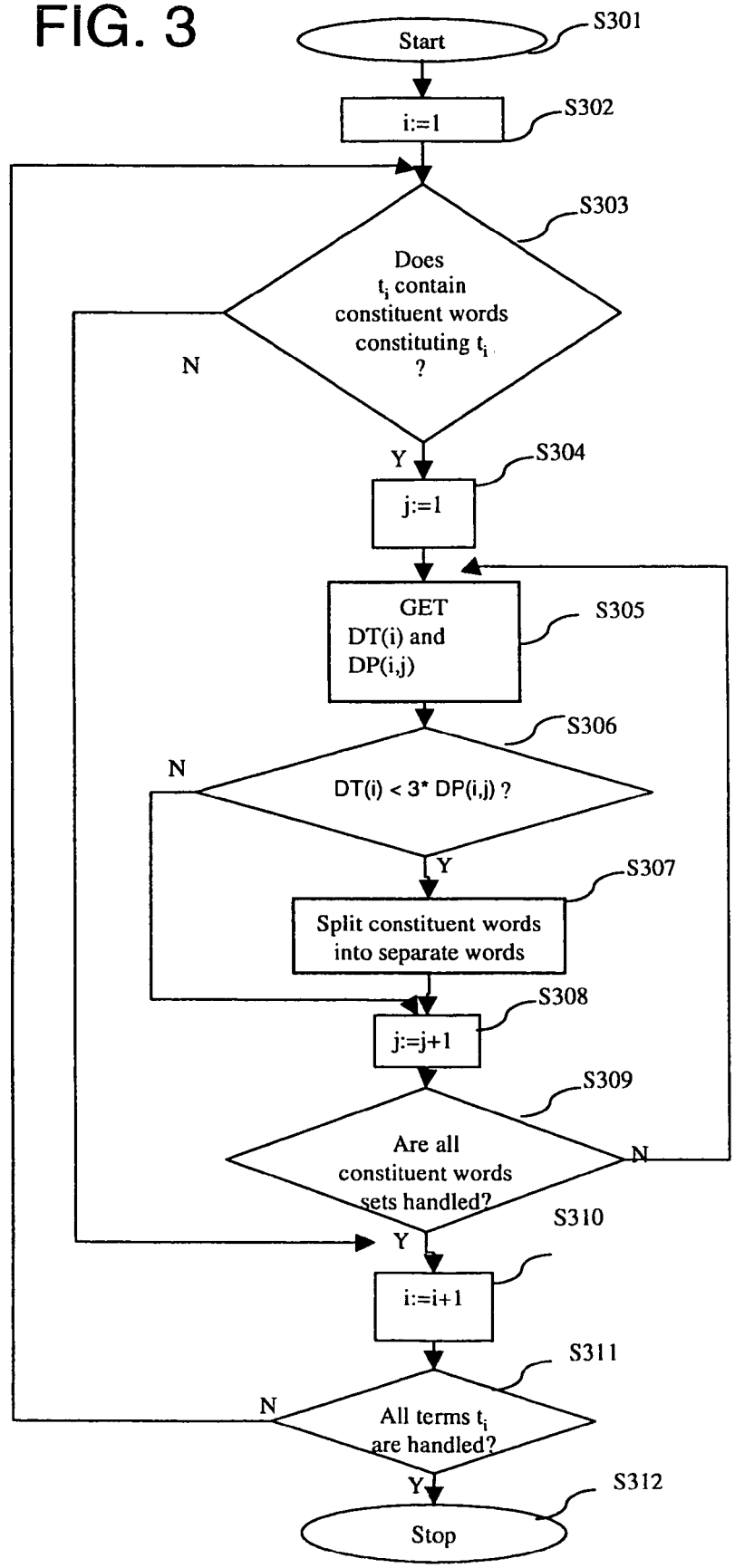
FIG. 3 is a flow diagram of an embodiment of the split compound decision module of FIG. 1.

FIG. 3 presents an embodiment of the split compound decision module (204) according to the invention. The split compound decision module (204) decides per term $t_i$ of a search whether the term is a compound word and whether to split the constituent words into separated words. Starting from the starting position S301, in step S302 the term counter i is set to 1. At step S303, it is determined whether term $t_i$ contains constituent words constituting the term $t_i$. The constituent words are derived from the word list (204). Several different constituent words combinations may exist constructing the same compound word, each combination is called a constituent words set. The word list is used to find a combination of words constituting the compound word. When constituent words are found (step S303 (Y)), then the constituent words set counter j is initialized to 1 in step S304. The next step S305 determines the number of documents that contain the compound word $t_i$. This function is called DT(i). Step S305 also determines the number of documents containing the constituent words of set j, this function being called DP(i,j). The function results of DT(i), and DP(i,j) can be found by means of the word list as will be demonstrated later.

In step S306, the split decision criterion DT(i)<3*DP(i,j) is evaluated for each $j^{th}$ set of constituent words. If it is determined that DT(i)<3*DP(i,j), then in step S307 the constituent words set j constituting the compound word $t_i$ is split to the words in a separated form. If at step S306 it is determined that DT(i)<3*DP(i,j) is not obtained, then the process is continued in step S308. The split decision criterion is evaluated for every term $t_i$ and eventually will result in a modified search.

In step S308 the constituent words set counter value j is increased with one and in step S309 it is evaluated whether all constituent words sets are handled. When not all constituent words sets are handled (N at step S309), then for the next constituent words set j the method is continued at step S305. When all constituent words sets are handled (Y at step S309), then the term counter value i is increased with one in step S310. The same yields when in step S303 no constituent words constituting the compound word are found (N at step S303) resulting in continuation in step S310.

In the next step S311, it is evaluated whether all terms $t_i$ are handled. When not all terms $t_i$ are handled (N at step S311) then the method continues in step S303. But, when all terms $t_i$ are handled (Y at step S311), then the method stops in step S312.

The person skilled in the art will understand that an embodiment of the invention is capable of handling one or more terms within the search and is capable to split the terms that are constituent words complying to the split decision criteria of step S306. Joining existing words together creates compound words. When joining words, linking morpheme letters may be inserted at the joint. Since there are no simple rules for when such linking morpheme letters may be inserted, it must be checked for between any two words. For German compound words, "s" and "es" as linking morphemes are used. For Dutch, as linking morpheme the "s" is allowed.

Figure 4:
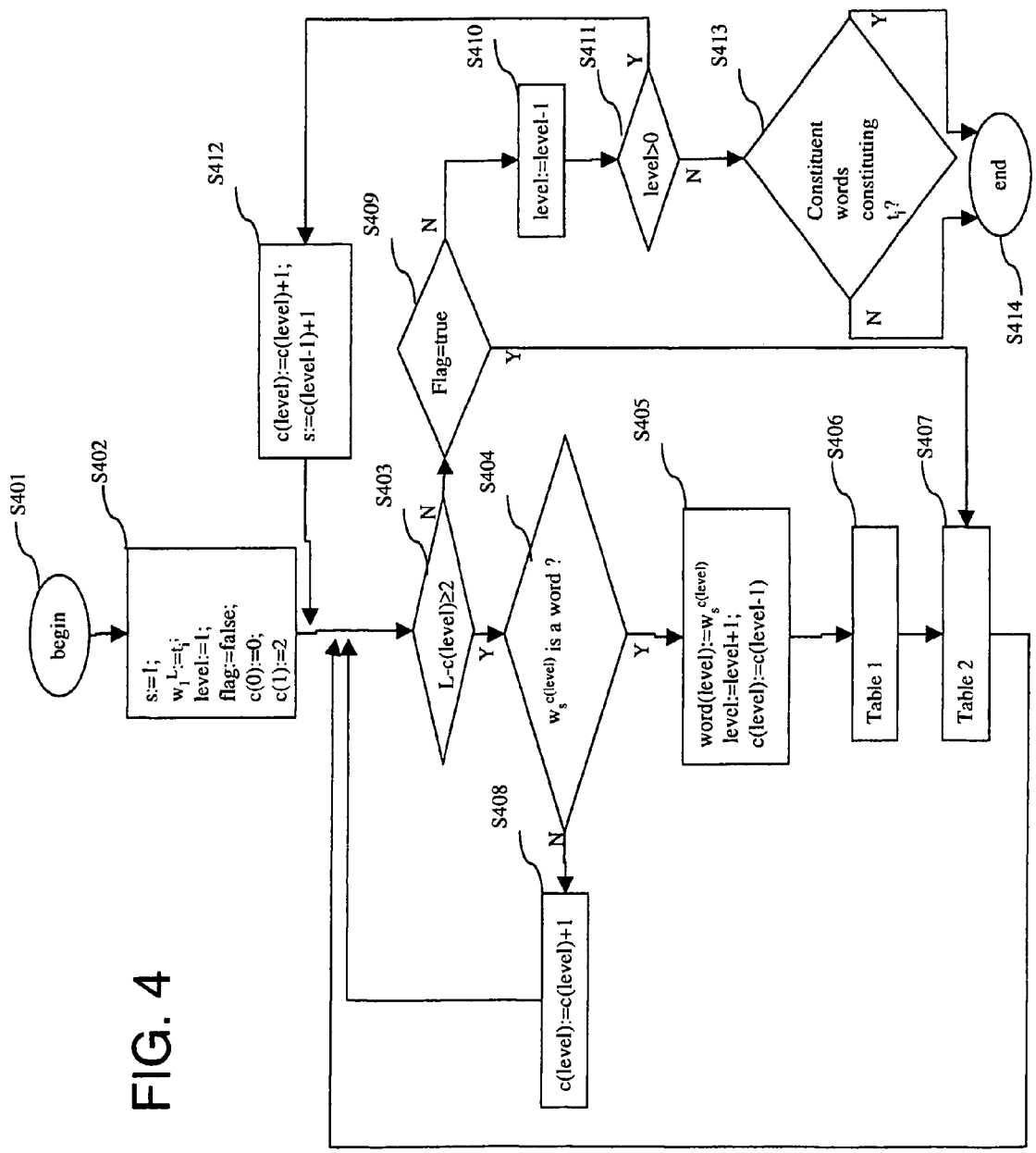
FIG. 4 is a flow diagram of an embodiment of the method to find the constituent words of the compound word according to the present invention.

FIG. 4 shows a flow diagram of an embodiment of the method (step S303 of FIG. 3) to find constituent words constituting the term $t_i$. The embodiment of FIG. 4 is for the Dutch language, where as an example only the linking morpheme "s" is considered. However, one skilled in the art will understand that for other compound languages other linking morphemes and more than one linking morpheme can be checked for and react on correspondingly.

Referring to FIG. 4, the method starts with step S401. In step S402 the term $t_i$ is copied into string $w_1^L$ where L describes the total number of characters of term $t_i$. Further step S402 initializes word character start position s to 1, a word level counter value (level) to 1, a flag to "false", the last character position of a potential word on a word level c(level=0) to value 0, and a word character end position value c(level=1) to value 2.

When in step S403, the penultimate character of string $w_s^L$ is not reached by character position c(level), so L−c(level) is $\geq 2$ (Y at step S403), then step S404 evaluates whether string $w_s^{c(level)}$ is a word by consulting a word list. When $w_s^{c(level)}$ is not a word (N at step S404) then in step S408 the word character end position value c(level) is increased with one. But when $w_s^{c(level)}$ is a word (Y at step S404), then in step S405 the word is stored in a word store based on the actual word level. For example, the first found word $w_s^{c(level)}$, which means the level is level 1, is stored in the word store as Word(level=1). Thereafter the level value is updated to the next word level (level:=level+1), and the character position value on the new level c(level) value is initialized to c(level−1).

In the next step S406 the situation value is determined, which is one of the eight situations (Table 1) that will be explained later in more detail now continuing with step S407. In step S407 depending on the situation value and the flag value, some actions are executed (Table 2). For instance, word character start position s and word character end position c(level) are adapted to new character positions and possibly a word is found and stored, which will be explained later in detail.

After step S407 the method continues with step S403. When in the step S403 the penultimate character of string $W_s^L$ is reached, so L−c(level)<2 (N at step S403), then the method continues with step S409. Step S409 results in "yes" and continues with step S407 when the flag status is "true". For example this is the case when the process of trying to split the word $w_{c(level)+1}^L$ is finished, and the process must continue to try to split the word $w_{c(level)+2}^L$. Thereafter the flag will become "false" and step S409 results in "no" (N at step S409) and will continue at step S410 in which the word level is decreased with one.

At step S411, it is checked whether all word levels are evaluated on finding other words. When the word level >0 (Y at step S411), then the process continues with expanding the word to another word by first increasing the word character end position value c(level) with one in step S412 and updating the word character start position value s with c(level−1)+1, and the process is continued at step S403. When all word levels are evaluated on word expansion to another word (N at step S411), then step S413 checks whether constituent words constituting $t_i$ are found and thereafter the method finishes in step S414.

FIG. 5 shows an embodiment of the internals of Table 1 (S406) and Table 2 (S407) in detail. In Table 1 (S406), four decision criteria determine the situation value. The decision criteria are: the flag status (true or false), the remainder $w_{c(level)+1}^L$ is a word (yes or no), character position $w_{c(level)+1}^{c(level)+1}$ is a "s" (yes or no), and the remainder $w_{c(level)+2}^L$ is a word (yes or no). In the fifth column of Table 1, the assigned situation value is shown. There is no situation value update when the flag value is true, as depicted in the last cell of the last row of Table 1. Thereafter Table 2 (S407) is entered with the eventual updated situation. In Table 2 (S407), two decision criteria determine the required actions: the situation value ($\in \{1, 2, \ldots, 8\}$) and the flag state (yes or no). Decision criteria "flag" of Table 2 is the same as the decision criteria "flag" of Table 1. The indicator CONSTITUENT( ) in Table 2 of FIG. 5 indicates that the set of found constituent words $\{word(h)_{h=1}^{h=level}\}$ constituting the compound word are added as a set to the constituent words set list. Here an example is given referring to Table 2: when entering Table 2 with situation=1 and the flag=false, then the following actions are executed: the flag is made true (to be able to split $w_{c(level)+2}^L$ later), the word $w_{c(level)+1}^L$ is copied into the store word(level) and the constituent words as a set are added as a set to the constituent words set list, thereafter the word $w_{c(level)+2}^L$ is copied into the store word(level) and the constituent words as a set are added to the constituent words set list. Thereafter the character positions values c(level)+2 and c(level)+3 are stored in helper constants respectively "sf" and "cf" for later use (to try to split the word $w_{c(level)+2}^L$ into two words after first trying to split the word $w_{c(level)+1}^L$), and the character position values s and c(level) are updated respectively with c(level)+1 and c(level)+2 and the method leaves Table 2 to continue at step S403 (FIG. 4) to try to split word $w_{c(level)+1}^L$ into two words.

EXAMPLES

To illustrate the working of the system of the present invention, some examples of determining constituent words satisfying the split decision criteria within compound words will be given below.

Example 1

In a first example, the search contains a Dutch term $t_i$, where i=1, "basketbalkampioenschappen". The English translation is "basketball championships". The split compound decision module (204) will find all constituent nouns constituting this compound word by means of the word list (203) including all nouns derived from the document collection (201). The word list of FIG. 6 is used as an example, of which the first column of the word list contains all nouns available in the document collection in alphabetical order.

The second column contains for each noun all document references from the document collection that incorporate this noun. The third column contains the number of documents from the document collection containing this noun. An embodiment of the word list can contain only the first two columns. The third column can be derived from the second column. The person skilled in the art will understand that the word list can be expanded with additional information such as the third column, or including other word types such as verbs and indicate the nouns with a noun indicator. The person skilled in the art will understand from FIG. 6 that the number of documents (third column) containing the compound word $t_i$ (first column) can be derived from the word list.

For this example the first main step (S303) is to determine all constituent words possibilities called sets constituting "basketbalkampioenschappen" by using the word list (203) of FIG. 6. For the Dutch compound word "basketbalkampioenschappen", the split compound decision module (204) finds 8 constituent nouns sets as shown in FIG. 7. In FIG. 7 all 8 found constituent words sets are presented in the second column. The first set (j=1) of the found constituent words "basketbal"+"kampioenschappen" is shown in FIG. 7 in the second cell of the second row. In step S305, the number of documents DT(i) containing the compound word $t_i$ "basketbalkampioenschappen" is determined. In this example, the compound word "basketbalkampioenschappen" is not found in any document within the document collection (201) by the semantic network module (202) as indicated by DT(i) being 0.

Next action in step S305 is to determine the number of documents, DP(i,j), that contain all constituent words of set j. The number of documents DP(i,j=1) that contain the constituent words in a separate form within one document can be derived from the word list depicted in FIG. 6. The word list indicates that the noun "basketbal" is used in documents referenced by [1] to [8] and the noun "kampioenschappen" is used in documents referenced by [1] to [6] and [9]. From the word list, then it can be derived that the two nouns are used both in the documents referenced by [1] to [6], and so DP(i,j=1)=6. Doing the same for the 7 remaining constituent words sets leads to DP(i,j)=0 for the remaining 7 constituent words. In FIG. 7 at fourth column, the DP(i,j) values are presented.

Then in step S306 the split decision criteria DT(i)<3*DP(i,j) per constituent words set j are evaluated. The result of this evaluation is presented in column 5 of FIG. 7. In this example, only the first (j=1) constituent words set satisfy this criteria. That is, in this example, only the constituent words "basketbal"+"kampioenschappen" comply to the split criteria and are thus split up in step S307 into the separated form "basketbal", "kampioenschappen". The split result of step S307 for this example is presented in column 6 of FIG. 7.

Applying the use of the search term "basketbalkampioenschappen" on the search engine (105) without the use of the split compound decision module results in no modified search and so not in finding any related documents from the document collection. But when applying the split compound decision module on the search term "basketbalkampioenschappen", the modified search will be for example:

("basketbal" AND "kampioenschappen"), but also valid is for example:

("basketbal" AND "kampioenschappen") OR "basketbalkampioenschappen".

The modified search results, possibility with the help of the word list of FIG. 6, in the following found related documents [1], [2], [3], [4], [5], and [6].

Example 2

Here a Dutch example is given on how the constituent words of a compound word $t_i$ are found with step S303. The English translation of the word is "course of life".

| Compound word = $w_1^{10}$ = | L | E | V | E | N | S | L | O | O | P |
|---|---|---|---|---|---|---|---|---|---|---|
| Character position = | 1 | 2 | 3 | 4 | 5 | 6 | 7 | 8 | 9 | 10 |

Several events during finding constituent words can be identified and are described in the Table 3 below. Note: The word list does not define "levens". The English translation is "life".

TABLE 3

| Event | Explanation |
|---|---|
| 1 | Step (402): initialisation; |
| 2 | Step (407): Noun 'leven' is found => Word(level = 1): = 'leven' |
| 3 | Step (408): |
|  | 'sloop' is a noun; it is started with 's'; 'loop' is a noun => situation 1 |
|  | Step (409): |
|  | Word(2): = 'sloop'. Add constituent words set to list (1) = leven + sloop |
|  | English: "life" + "demolition" |
|  | Word(2): = 'loop'. Add constituent words set to list (2) = leven + loop English: "life" + "stream" |
| 3.1 | Step (404): Try to split 'sloop' |
| 3.2 | Step (405) 'sloop' cannot be split |
| 3.3 | Step (404): Try to split 'loop' |
| 3.4 | Step (405): 'loop' cannot be split |
| 4 | Step (414): Back to the level: 'leven<u>s</u>'. |
|  | Expand 'leven<u>s</u>' to another word |
| 5 | Step (405): "leven<u>s</u>" cannot be expanded to another word |
| 6 | Step (41 5): END |

The events of Table 3 are put in Table 4 with the event status of: the (noun) level, the noun start position s, and the word character end position c(level) for two levels c(level=1), and c(level=2).

TABLE 4

|  | event | | | | | | | | | |
|---|---|---|---|---|---|---|---|---|---|---|
|  | 1 | 2 | 3 | 3.1 | 3.2 | 3.3 | 3.4 | 4 | 5 | 6 |
| Level = | 1 | 1 | 2 | 2 | 2 | 2 | 2 | 1 | 1 | 0 |
| s = | 1 | 1 | 6 | 6 | 6 | 7 | 7 | 1 | 1 | 1 |
| c(1) = | 2 | 5 | 5 | 5 | 5 | 5 | 5 | 6 | 9 | 9 |
| c(2) = | — | — | 5 | 7 | 9 | 8 | 9 | 9 | 9 | 9 |

Example 3

Another example is given.

| Compound word = $w_1^{17}$ = | A | L | P | E | N | V | E | R | K | E | E | R | S | P | L | A | N |
|---|---|---|---|---|---|---|---|---|---|---|---|---|---|---|---|---|---|
| Character position = | 1 | 2 | 3 | 4 | 5 | 6 | 7 | 8 | 9 | 10 | 11 | 12 | 13 | 14 | 15 | 16 | 17 |

Several events during finding constituent words can be identified described in Table 5 below. Note: the word list did not contain the noun "verkeersplan" (English: "traffic plan").

TABLE 5

| Event | Explanation |
|---|---|
| 1 | Step (402): Initialisation |
| 2 | Step (407): Noun 'alpen' is found => Word(1):='alpen' |
| 3 | Step (409):<br>'verkeersplan' is not a noun; it does not start with 's';<br>'erkeersplan' is not a noun. => situation 8 |
| 4 | Step (403): Try to split 'verkeersplan' |
| 5 | Step (407): Noun 'verkeer' is found => Word(2):='verkeer' |
| 6 | Step (408):<br>'splan' is not a noun; it starts<br>with 's'; 'plan' is a noun. => situation 5.<br>Step (409):<br>Word(3)='plan'.<br>Add constituent words set to list(1)= alpen + verkeer + plan<br>(English: alps + traffic + plan) |
| 6.1 | Step (404): Try to split 'plan' |
| 6.2 | Step (405): 'plan' cannot be split |
| 6.3 | Step (404): Try to split 'splan' |
| 6.4 | Step (405): 'splan' cannot be split |
| 7 | Step (414): back to level<br>'alpen' + 'verkeers'. Try to expand 'verkeers' to another word. |
| 8 | Step (405): no other split up of 'verkeersplan' were found |
| 9 | Step (414): back to level: 'alpenv'.<br>Try to expand 'alpenv' to another word. |
| 10 | Step (405): 'alpenverkeersplan' cannot be split anymore. |
| 11 | Step (415): END |

In Table 6 an event status is given of: the noun level, the noun start position s, and the word character end position c(level) for three levels c(level=1), c(level=2) and c(level=3).

TABLE 6

| | Event | | | | | | | | | | | | | | |
|---|---|---|---|---|---|---|---|---|---|---|---|---|---|---|---|
| | 1 | 2 | 3 | 4 | 5 | 6 | 6.1 | 6.2 | 6.3 | 6.4 | 7 | 8 | 9 | 10 | 11 |
| Level = | 1 | 1 | 2 | 2 | 2 | 3 | 3 | 3 | 3 | 3 | 2 | 2 | 1 | 1 | 0 |
| s = | 1 | 1 | 6 | 6 | 6 | 13 | 14 | 14 | 13 | 13 | 6 | 6 | 1 | 1 | 1 |
| c(1) = | 2 | 5 | 5 | 5 | 5 | 5 | 5 | 5 | 5 | 5 | 5 | 5 | 6 | 16 | 16 |
| c(2) = | — | — | 5 | 7 | 12 | 12 | 12 | 12 | 12 | 12 | 13 | 16 | 16 | 16 | 16 |
| c(3) = | — | — | — | — | — | 12 | 15 | 16 | 14 | 16 | 16 | 16 | 16 | 16 | 16 |

The processing steps of the methods according to the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

The present invention being thus described, it will be obvious that the same may be varied in many ways. Such variations are not to be regarded as a departure from the spirit and scope of the invention, and all such modifications was would be obvious to one skilled in the are intended to be included within the scope of the following claims.

The invention claimed is:

1. A computerized method adapted to be used with computer hardware for determining constituent words of a compound word, the method comprising the steps of:
   determining, from a document collection, a number of documents containing a compound word;
   determining, from the document collection, a number of documents containing constituent words constituting the compound word;
   determining a ratio between the number of documents containing the compound word and the number of documents containing the constituent words constituting the compound word; and
   splitting the compound word into the constituent words when the ratio is smaller than a threshold value.

2. The computerized method according to claim 1, further comprising:
   detecting a linking morpheme in the compound word.

3. The computerized method according to claim 1, further comprising:
   finding the constituent words by using a word list derived from the document collection.

4. The computerized method according to claim 1, wherein the step of determining the number of documents containing the compound word determines the number of documents containing the compound word from a word list derived from the document collection.

5. The computerized method according to claim 1, wherein the step for determining the number of documents containing the constituent words constituting the compound word determines the number of documents containing the constituent words constituting the compound word from a word list derived from the document collection.

6. The computerized method according to claim 1, wherein the threshold value depends on the document collection.

7. The computerized method according to claim 1, wherein the threshold value is 3.

8. The computerized method according to claim 1, wherein the compound word and constituent words belong to a grammatical category of nouns.

9. The computerized method according to claim 3, wherein the word list includes single and plural forms of each noun.

10. A computerized method for information retrieval adapted to be used with computer hardware, the method comprising the steps of:
   entering at least one search term comprising a compound word;
   determining, from a document collection, a number of documents containing the compound word;
   determining, from the document collection, a number of documents containing constituent words constituting the compound word;
   determining a ratio between the number of documents containing the compound word and the number of documents containing the constituent words constituting the compound word;
   splitting the compound word into the constituent words when the ratio is smaller than a threshold value;
   delivering the constituent words; and
   carrying out a search with the delivered constituent words as search terms.

11. A computer program product embodied on at least one computer-readable storage medium, for determining constituent words of a compound word, the product comprising computer-executable instructions for:
   determining, from a document collection, a number of documents containing a compound word;
   determining, from the document collection, a number of documents containing constituent words constituting the compound word;
   determining a ratio between the number of documents containing the compound word and the number of documents containing the constituent words constituting the compound word; and
   splitting the compound word into the constituent words when the ratio is smaller than a threshold value.

12. A computer program product embodied on at least one computer-readable storage medium, for retrieving information, the product comprising computer-executable instructions for:
   entering at least one search term comprising a compound word;
   determining, from a document collection, a number of documents containing the compound word;
   determining, from the document collection, a number of documents containing constituent words constituting the compound word;
   determining a ratio between the number of documents containing the compound word and the number of documents containing the constituent words constituting the compound word;
   splitting the compound word into the constituent words when the ratio is smaller than a threshold value;
   delivering the constituent words; and
carrying out a search with the delivered constituent words as search terms.

* * * * *